US011245614B1

(12) United States Patent
Backes et al.

(10) Patent No.: US 11,245,614 B1
(45) Date of Patent: Feb. 8, 2022

(54) MANAGING NETWORK CONFIGURATION THROUGH NETWORK PATH ANALYSIS

(71) Applicant: Amazon Technologies, Inc., Seattle, WA (US)

(72) Inventors: John David Backes, Minneapolis, MN (US); Samuel Bayless, Vancouver (CA); Daniel William Dacosta, Saint Paul, MN (US); Ao Li, Burnaby (CA)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/114,327

(22) Filed: Dec. 7, 2020

(51) Int. Cl.
*H04L 12/46* (2006.01)
*H04L 12/751* (2013.01)
*H04L 12/24* (2006.01)

(52) U.S. Cl.
CPC .......... *H04L 45/02* (2013.01); *H04L 12/4641* (2013.01); *H04L 41/145* (2013.01)

(58) Field of Classification Search
USPC ....................................................... 370/254
See application file for complete search history.

(56) References Cited

U.S. PATENT DOCUMENTS

| 10,826,723 | B1* | 11/2020 | Strauss | H04L 12/4633 |
| 10,862,709 | B1* | 12/2020 | Dickinson | H04L 12/4633 |
| 2015/0009831 | A1* | 1/2015 | Graf | H04L 47/31 370/236 |
| 2016/0057015 | A1* | 2/2016 | Osborne | H04L 41/18 370/254 |
| 2019/0173807 | A1* | 6/2019 | Balan | H04L 45/02 |

* cited by examiner

Primary Examiner — Anthony Mejia
(74) Attorney, Agent, or Firm — Knobbe, Martens, Olson & Bear, LLP

(57) ABSTRACT

Features are disclosed for managing routing rules stored by a routing device and used to manage network traffic in a network. A computing device can receive multiple routing rules corresponding to multiple routing devices in the network. The computing device can use a formal specification and a snapshot to generate a model of the network. The computing device may use the model in order to statically determine the set of possible paths without causing the transmission of data between a routing device and a destination. the computing device may compare the identified routing rules and the possible paths in order to determine excess routing rules. The computing device may remove the excess routing rules from the routing rules for each routing device such that each routing device routes subsequent network traffic based on the updated routing rules.

20 Claims, 7 Drawing Sheets

MANAGING NETWORK CONFIGURATION THROUGH NETWORK PATH ANALYSIS

BACKGROUND

Networks include computing devices that are communicating data over the network. A computing device can maintain various variables that are associated with how the computing device may communicate data with another computing device. In some implementations, in order to communicate data to another computing device, a computing device may first transmit the data to a routing device that determines how to route the data. The routing device may determine a routing table (e.g., a set of routing rule(s)) that is associated with the computing device and determine how to route the data based on the routing table. The routing table may include multiple routing rules that each indicate an endpoint (e.g., a source or destination of the data) and a routing decision (e.g., how the routing device should route the data). The routing device may determine routing rule(s) that are associated with the data by parsing the data to determine an endpoint of the data. Based on the endpoint of the data, the routing device may determine a routing rule and a corresponding routing decision for the data. In some instances, the routing device may determine that multiple routing rules are associated with the data and, in order to determine how to route the data, the routing device may analyze the routing decisions associated with each of the multiple routing rules. Based on the associated routing table, the routing device may then determine how to route the data (e.g., the routing device may block (may not allow) certain data from proceeding to a destination and may allow other data to proceed to a destination).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
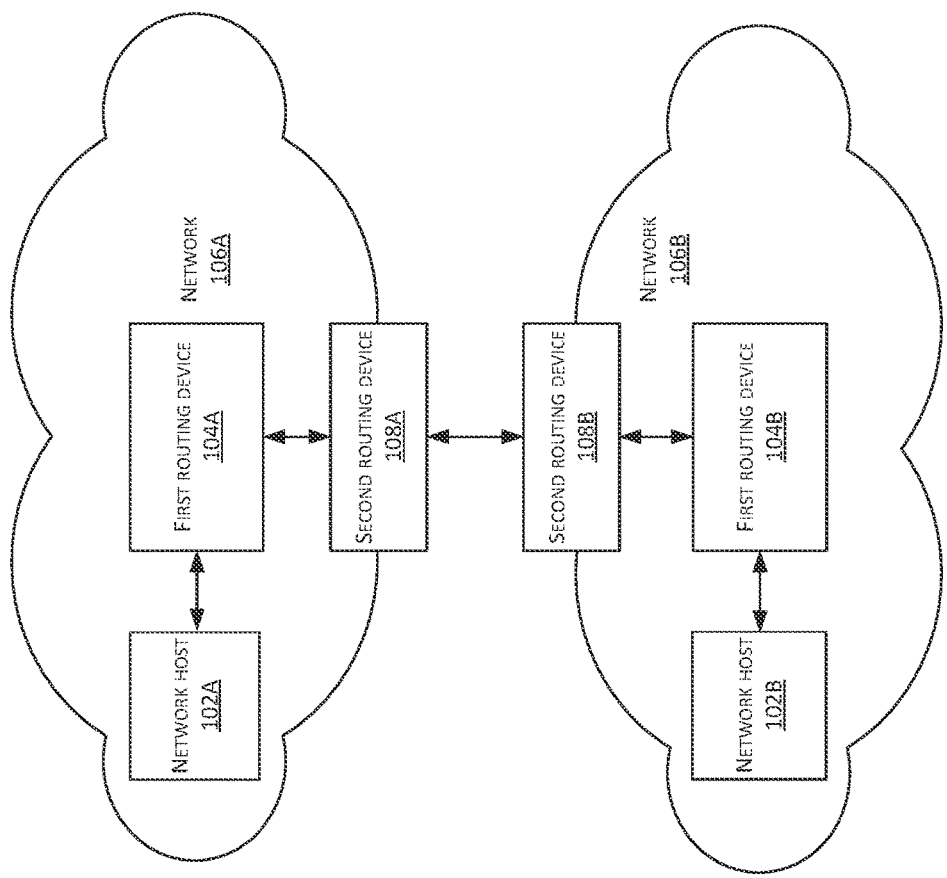
FIG. 1 depicts a schematic diagram of an example networked environment according to some embodiments.

The present disclosure generally relates to a network configuration management service that aids in identifying and remediating suboptimal configuration settings affecting network communications to, from, and/or within a network environment. The service obtains a formal specification of the current state of the network environment representing the rules and other configuration settings that are used to make network traffic routing decisions within the network environment. Based on an analysis of the formal specification, the service can identify one or more sub-optimal configuration settings (e.g., redundant, lenient, and/or unused security group rules). Use of the formal specification allows the service to perform this analysis "statically," without first sending packets through the network environment to test the possible paths. The service determines the manner in which modification, replacement, or removal of the sub-optimal configuration setting(s) changes the possible communication paths within the network environment. If the change to the network configuration setting(s) produces a desirable change in the possible communication paths within the network, or if the change reduces the complexity of network configuration settings while preserving the desired set of possible communication paths, the change may be implemented. In some cases, the process may be repeated in an iterative manner to test various changes to the configuration settings until one or more criteria are met, such as finding the smallest set of configuration settings that produces the same set of possible communication paths as currently available within the network environment, finding the set of configuration settings that provides only a desired set of possible communication paths, etc.

A network may be configured such that one path of traffic from a source computing device to a destination computing device includes the traffic flowing through a routing device. Such routing devices can perform actions such as routing, load balancing, firewalling, and other routing services. The routing device may intercept all or a portion of the network traffic transmitted to and/or from a particular serviced environment. In some cases, the routing device is a firewall (e.g., a local firewall or a network firewall) that can monitor and control network traffic. The firewall can act as a barrier for a path of network traffic (e.g., traffic between the serviced environment and another environment) to control traffic to and/or from the serviced environment. For example, the firewall may store a routing table that indicates valid (e.g., permitted) network sources and/or destinations, and invalid (e.g., prohibited) network sources and/or destinations. The routing table may include information identifying the path and information identifying a routing decision. For example, the firewall may communicate with a data store that stores information identifying a path of network traffic (e.g., "source_ip, destination_ip") and information identifying a routing decision (e.g., "drop" or "transmit"). Upon receiving data associated with a particular path of network traffic, the firewall may parse the data to determine the associated path. The firewall can then search for a corresponding routing decision associated with the particular path of network traffic and execute that routing decision. The firewall may then control the network traffic that is allowed to pass to and/or from the serviced environment.

In further cases, the routing device is a router or a load balancer that forwards traffic to and/or from the serviced environment. For example, assume a path exists between a first device within a serviced environment and a second device external to the serviced environment. Further assume that the path between the first device and the second device includes a particular network appliance as selected by the routing device. The routing device may select the network appliance for the path of network traffic based on information associated with the particular path. The routing device may therefore maintain, as the routing decision, information that states that the path of traffic from the first device to the second device should be routed by the routing device to the particular network appliance.

In some cases, the routing device is a router. The router can act as a forwarder for a path of network traffic that forwards network traffic to a next destination prior to another device (e.g., the next destination, another router, etc.) forwarding the network traffic to the final destination of the network traffic. Based on the path of network traffic, the router can search an associated routing table. The routing table may store information identifying a particular path of network traffic (e.g., "source_ip, destination_ip") and information identifying a next hop (e.g., "network appliance #1"). Based on the information identifying the next hop, the router can forward the path of network traffic to the next hop.

In other cases, the routing device is a load balancer. By using the paths of network traffic, the routing device can load balance the traffic across multiple network destinations (e.g., network appliances). The routing device can maintain load balancing information in a routing table linking a particular path of the traffic to a particular destination for processing, such that subsequent packets of network traffic corresponding to the same path will be routed to the same appliance prior to being routed to the intended destination. As network traffic between devices can correspond to multiple paths between the devices, the routing device may route network traffic to different network appliances based on the particular path of traffic. For example, the routing device may route a first path of network traffic to a first appliance and a second packet of a second path of network traffic to a second appliance.

A routing device—whether a firewall, router, load balancer, or some other routing device—may store routing decisions for multiple paths of the network traffic that each indicate how network traffic received by the routing device should be routed. Multiple routing decisions may be associated with the same path, each routing decision indicating how to route data associated with the path. For example, a path of network traffic may exist between a first computing device and a second computing device and a routing device may store multiple routing decisions that are associated with the path of network traffic. Further, a first routing decision may be associated with a narrow path of network traffic and a second routing decision may be associated with a different, broader path of network traffic that includes the narrow path of network traffic. As both the first routing decision and the second routing decision are associated with the narrow path of network traffic, upon receiving data associated with the narrow path of network traffic, the routing device may route the network traffic based on both or either of the first routing decision and the second routing decision. Therefore, a routing device may determine the routing decisions that are associated with the path of network traffic and determine how to route the path of network traffic based on each routing decision.

In conventional systems, the amount of path information and corresponding configuration settings regarding routing decisions stored by the routing device in order to manage paths between two or more devices may be large. For example, the routing device may service thousands, tens of thousands, etc., paths between devices and each path may be associated with multiple routing decisions, thus the routing device may be required to store a significant number of configuration settings regarding routing decisions. As a result, the routing device may manage, for each source device, a number of unique paths associated with the source device and a number of corresponding routing decisions, potentially overloading memory requirements of the routing device. Further, as new routing decisions are provided to the routing device for a particular path, the complexity of the routing decisions associated with the path may increase and the routing device may store unused, redundant, or lenient routing decisions for the particular path. For example, as new routing decisions are added, these decisions may overlap with prior routing decisions. If one of the new routing decisions or the old routing decisions are not removed, then the routing device may store latent, redundant routing decisions. As a network administrator may be unaware of the redundancy between routing rules, the use of latent, redundant routing decisions may decrease efficiency and obfuscate the network administrator's ability to troubleshoot an issue.

As a routing device may store routing decisions for multiple paths of network traffic and may store multiple routing decisions for one path of network traffic, the number of routing decisions stored by the routing device can be large. Such a quantity of routing decisions may extend the time required to determine how to route a particular path of network traffic. Typically, such routing devices do not actively manage the routing rules stored by the routing device and the number of routing rules stored by the routing device can exponentially increase as the routing device operates. Increasing the number of routing rules can involve complexity that increases the processing power required and the possibility of errors. Additionally, the number and complexity of routing decisions can increase memory demands. The disclosed routing service addresses these challenges, among others, by (1) determining routing decisions that are redundant, (2) determining routing decisions that are lenient, (3) determining routing decisions that are unused, and/or (4) modifying the routing decisions stored by the routing device based on the determined routing decisions.

Aspects of the present disclosure relate to managing the configuration settings used to make routing decisions in virtualized network environments. These environments are generally referred to herein as "serviced environments," where the routing devices may exist external or internal to such serviced environments. More specifically, as disclosed herein, managing configuration settings stored by or for a routing device can enable a routing device to efficiently determine a routing decision associated with a particular path of network traffic, such that a routing device is able to efficiently route traffic corresponding to multiple paths. The embodiments described herein can provide for efficient, resilient, and secure routing of traffic for serviced environments, by providing a routing device that obtains traffic stemming from or addressed to a serviced environment and routes such traffic to an appropriate destination.

Some aspects of this disclosure address the problems noted above, among others, by determining a current configuration of a serviced environment, including a set of routing rules, network address translation ("NAT") mappings, etc. associated with the serviced environment. The set of routing rules may correspond to approved and/or prohibited paths for the network traffic associated with the serviced environment. A serviced environment configuration may correspond to multiple routing rules that indicate how traffic to, from, and/or within the serviced environment will be routed. Further, a serviced environment may include multiple routing devices. For example, a first routing device may intercept network traffic transmitted from certain devices in the serviced environment and transmit a portion of the network traffic to a second routing device which may transmit a portion of that portion of the network traffic to another device, and so on. Each routing device may determine a respective routing decision for the network traffic. In such cases, each routing device may store multiple routing rules. Therefore, each routing device associated with the serviced environment may provide a set of routing rules that affect network traffic associated with the serviced environment.

Additional aspects of this disclosure relate to using the routing rules to determine a set of possible communication paths to, from, and/or within the serviced environment. The set of possible communication paths, also referred to as "feasible paths," may include possible routes that network traffic associated with the serviced environment can take. The set of possible paths may be based on the current configuration of the serviced environment and the network architecture associated with the serviced environment. For example, the network architecture may include the devices and/or environments that are in communication with the serviced environment. Based on the current configuration and the network architecture, a model of the serviced environment may be generated. In some cases, a reasoning engine may analyze the model. For example, the reasoning engine may be a datalog solver, a satisfiability modulo theories ("SMT") solver, a first-order theorem prover, or the like. The reasoning engine may obtain the model generated from a formal specification and a snapshot of the network architecture. The formal specification may formalize the semantics of the current configuration and the network architecture. For example, the formal specification details how a route table directs traffic, how a firewall applies rules, or how a load balancer balances a given load. Further, the snapshot may describe the topology and details of the network. For example, the snapshot details the routing devices, the environments, the route tables, the routing rules, etc. associated with a serviced environment. The reasoning engine or some other subsystem or component may combine the formal specification and the snapshot in order to generate a model that represents the set of paths associated with the serviced environment, or from which the set of paths associated with the serviced environment can be derived.

Further aspects of this disclosure relate to identifying one or more sub-optimal configuration settings (e.g., routing rules) associated with the serviced environment. Identifying a sub-optimal configuration setting may be based on a comparison of the possible set of paths to another set of paths generated using a different model of the serviced environment. For example, the different model may exclude one or more configuration settings that are currently used by the serviced environment. An excluded configuration setting may correspond to an excess routing rule that is redundant. The different model may be used to generate a set of possible paths over which packets may be communicated, if the serviced environment were to be modified to exclude the configuration setting. The first set of possible paths generated using the model of the current serviced environment may then be compared to the second set of possible paths generated using the different model of the serviced environment. If there are no paths from the first set of possible paths missing from the second set of possible paths, then the excluded configuration setting may have been redundant and is a candidate to be removed. Another comparison may be performed to verify that there are no new possible paths in the second set of possible paths and not in the first set of possible paths. The presences of any such new paths may indicate that the configuration setting was not necessarily redundant, by may have been used to exclude certain paths. In this case, the configuration setting may not be a candidate for exclusion. Based at least in part on identifying a redundant configuration setting, a modified set of configuration settings may be generated that exclude the configuration setting identified as being redundant. At least a portion of the modified set of configuration settings may be provided to one or more routing device(s) associated with the serviced environment such that subsequent traffic associated with the serviced environment and received by the routing device(s) is routed according to the modified set of configuration settings. The modified set of configuration settings and the original (or previous) set of configuration settings may share certain similarities such that the modified set of configuration settings and the original set of configuration settings will cause traffic to be transmitted in the same manner. For example, if the original set of configuration settings indicate that certain network traffic should be dropped by the routing device, the modified set of configuration settings may also indicate that the certain network traffic should be dropped. As the modified set of configuration settings corresponds to the original set of configuration settings with excess configuration settings removed, network traffic is routed in the same manner.

Still further aspects of this disclosure relate to methods of comparing different formal specifications or other models of a serviced environment to identify changes to possible paths of network traffic that may be caused by changes to the underlying configuration settings represented by the models. In some embodiments, the reasoning engine may analyze the models and generate lists of the different sets of possible paths within the serviced environment: one or more lists with changes to the configuration settings, and a list without the changes to the configuration settings. The presence of paths in one list but not the other list indicates that the change to the configuration setting(s) had an effect on the serviced environment. The effect may be desirable (e.g., if the goal is to loosen or tighten restrictions) or undesirable (e.g., if the goal is to remove redundant settings that have no observable effect). In some embodiments, rather than generating lists of possible paths and comparing the lists, the reasoning engine may jointly analyze the different models to directly produce a list of any differences in the possible paths. In some embodiments, the reasoning engine may be used to generate a model (or directly generate a set of configuration settings that would be represented by a model) that would result in a serviced environment having a desired set of possible paths. For example, a user may provide a desired set of possible paths, or a desired set of possible paths may be derived from analysis of network traffic. The reasoning engine may use the desired set of possible paths to directly generate a set of configuration settings. Alternatively, candidate sets of configuration settings may be converted into models that may be analyzed using the reasoning engine to determine whether a candidate set of configuration settings results in the desired set of possible paths.

Various aspects of the disclosure will now be described with regard to certain examples and embodiments, which are intended to illustrate but not limit the disclosure. Although aspects of the embodiments described in the disclosure will focus, for the purpose of illustration, on particular types of network devices (e.g., a firewall, a router, or a load balancer), particular types of network configuration settings (e.g., those represented by security groups, access control lists, etc.), particular types of network modeling specifications, particular types of logical reasoning engines, and the like, one skilled in the art will appreciate that the techniques disclosed herein may be applied to any number of types of computing devices, network configuration settings, network modeling specifications, logical reasoning engines, etc.

FIG. 1 illustrates an example environment 100 in which a plurality of routing devices 104A, 104B, 108A, 108B may be implemented according to some embodiments, enabling traffic to be routed between serviced environments. The routing devices 104A, 104B, 108A, 108B may be one or more of a firewall, a load balancer, a router, etc. Further, routing devices 104A, 104B, 108A, 108B may be referred to as an "appliance gateway," an "internet gateway," or a "stateful network routing service" in some implementations. The example environment 100 may include one or more network hosts 102A, 102B (e.g., a source network host 102A and/or a destination network host 102B) that exist within distinct networks 106A and 106B (each a respective network environment), one or more first routing devices 104A and 104B, and one or more second routing devices 108A and 108B in communication over the networks 106A and 106B. It will be understood that the routing devices 104A, 104B, 108A, and 108B may comprise any combination of local routing devices, network routing devices, or additional types of routing devices. For example, first routing devices 104A and 104B may be local routing devices and second routing devices 108A and 108B may be network routing devices. The example environment 100 may include more, less, or different routing devices.

The environment 100 can be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a virtual private network (VPN) or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, such as one or more of the routing devices 104A, 104B, 108A, 108B, and which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Each network 106A and 106B illustratively represents a distinct network environment. In one embodiment, either or both networks 106A and 106B are virtualized networks logically implemented by a physical network referred to as the substrate, which includes physical network hardware such as routers, switches, network address translators (NATs), and so on, as well as the physical connections among the devices. For example, either or both networks 106A and 106B may represent a virtual private network environment ("VPE"). Generally described, a VPE can represent a virtualized computing network (hosted by a host device or multiple host devices on a physical network) that enables devices connected to (or "inside") the VPE to communicate as if they were connected to one another via a physical local area network ("LAN"). A VPE may in some instances be referred to as a virtual private clouds ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network. In one specific, non-limiting embodiment, a network computing provider may comprise a plurality of physical network computing devices. The network computing provider may be configured to host a plurality of virtual network computing providers (VPEs/VPCs), each of the plurality of virtual network computing providers logically separated from each other virtual network computing provider of the plurality of virtual network computing providers.

Each network 106A and 106B can logically include one or more hosts 102A, 102B, which represent computing devices operating within the network. Network hosts 102A, 102B may be physical devices, or logical devices implemented on underlying physical computing devices. For example, network hosts 102A, 102B may represent virtualized devices provided by a hosted computing environment, which may also be referred to as a "cloud computing environment." Such an environment can include a number of dynamically provisioned and released computing resources. Unless otherwise stated, the term "host" or "network host," as used herein, is intended to refer to a computer or computing device connected to and participating in a network, including servers and clients. For avoidance of ambiguity, it is noted that the term "host" may have other meanings in other contexts. For example, in the virtualization context, a "host device" may refer to an underlying (e.g., physical) computing device that implements a virtualized computing device. The present disclosure utilizes the terms "physical host" or "virtualization host" to refer to hosts in the virtualization context, to avoid ambiguity. Accordingly, general reference to a "host" should be understood to refer to a network host, and not necessarily to a physical computing device or virtualization host. Nevertheless, it is recognized that a virtualization host may represent a network host, and vice versa.

Each network 106A and 106B includes a first routing device 104A and 104B respectively that acts as a first gateway (e.g., a local gateway) for the network 106A and 106B. Each first routing device 104A and 104B may transmit network traffic to a respective second routing device 108A and 108B. Further, to enable communications between networks 106A and 106B (or to other networks not shown in FIG. 1, such as a wide area network ("WAN") or global area network ("GAN") like the Internet), each network 106A and 106B includes a second routing device 108A and 108B respectively that acts as a second gateway (e.g., a network gateway) for the network 106A and 106B. Accordingly, hosts 102A, 102B may send data (e.g., in the form of packets) to the first routing device 104A, 104B of their network 106A, 106B which send the data to their second routing device 108A, 108B of their network 106A and 106B, in order to route the data to an appropriate destination (e.g., second routing device 108A or 108B).

Embodiments of the present disclosure enable routing devices 104A, 104B, 108A, and 108B to route traffic within and between networks 106A and 106B. These routing devices 104A, 104B, 108A, and 108B may provide various functions, such as monitoring, firewalling, filtering, malware scanning, and so forth. In one example, the routing devices 104A, 104B, 108A, and 108B may perform the same function (e.g., firewalling). Further, each of the routing devices 104A, 104B, 108A, and 108B may perform the same function according to a corresponding route table or routing rule stored by the respective routing device. In other examples, the routing devices 104A, 104B, 108A, and 108B may perform different functions. For example, first routing device 104A may perform firewalling and second routing device 108A may perform load balancing. The routing devices 104A, 104B, 108A, and 108B may perform the various functions on each packet of traffic received from the network hosts 102A and 102B.

As a result of performing corresponding functions, the routing devices 104A, 104B, 108A, and 108B may determine how to route a packet of network traffic. To facilitate routing of traffic between networks 106A and 106B, the routing devices 104A, 104B, 108A, and 108B may maintain network configuration settings, such as routing rules, NAT mappings, etc. For example, the first routing device 104A may associate an incoming packet with a specific routing rule that states that the first routing device 104A should route traffic addressed from the network host 102A and addressed to the network host 102B by first routing the traffic to the second routing device 108A. The specific routing rule may correspond to a firewalling decision, a load balancing decision, or any other routing decision. Each of the routing devices 104A, 104B, 108A, and 108B may use the routing rules to determine how to route a packet. Further, the routing rule may indicate whether to forward or drop a packet. The routing devices 104A, 104B, 108A, and 108B may forward (e.g., allow) a packet in order to send the packet to its destination network host. The routing devices 104A, 104B, 108A, and 108B may inspect the packet and allow the packet to proceed on to the destination network host without making changes to the content of the packet. In some embodiments, routing devices 104A, 104B, 108A, and 108B may not allow (e.g., reject or drop) the packet in order to prevent the packet from being sent to the destination network host. For example, if the routing devices 104A, 104B, 108A, and 108B are a firewall, one of the routing devices 104A, 104B, 108A, and 108B may drop the packet based at least in part on a pre-defined firewalling policy and discard the packet. Therefore, the routing devices 104A, 104B, 108A, and 108B may determine a routing decision for packets.

In some cases, as part of determining the routing decision, the routing devices 104A, 104B, 108A, and 108B may perform load balancing. For example, based on the header of the packet, the routing devices 104A, 104B, 108A, and 108B may determine to load balance the traffic over a fleet of network appliances. The packet header may indicate to the routing devices 104A, 104B, 108A, and 108B to send the traffic to a particular fleet of appliances prior to transmission to the destination. The routing devices 104A, 104B, 108A, and 108B may select a network appliance of the fleet of network appliances through a hashing approach designed to approximately equally distribute network traffic among the fleet of network appliances that perform a replicated function. A load balancer may use other approaches to selection including time-based selection approaches or selection approaches that monitor throughput data rate, processor load, connection quantities, availability zone affinity, and/or other metrics pertaining to the fleet of network appliances and attempt to assign paths based at least in part on one or more of these metrics in an equitable manner. Through these approaches, the routing devices 104A, 104B, 108A, and 108B may perform load balancing.

In order to determine the routing decision, the routing devices 104A, 104B, 108A, and 108B may parse the traffic in order to determine path information associated with a particular packet of traffic. The path information may correspond to one or more field values of a given packet. The one or more field values may correspond to groups (tuples) of data (e.g., Internet protocol ("IP") addresses, ports, protocol, etc.). The routing devices 104A, 104B, 108A, and 108B may further each maintain local memory, in the associated availability zones, storing the determined routing rule for a specific set of one or more field values. For example, the routing devices 104A, 104B, 108A, and 108B may associate a specific set of one or more field values with a specific routing decision (e.g., a firewalling decision, a load balancing decision, or a routing decision). Therefore, path information of a packet is tied to a specific routing decision that indicates a manner of routing a corresponding packet.

In order to manage the routing rules that are stored by a particular routing device, the routing rules stored by each routing device 104A, 104B, 108A, and 108B are managed by a rule processing system to remove excess routing rules. The rule processing system may obtain the routing rules that are stored by each routing device 104A, 104B, 108A, and 108B. The routing rules may correspond to routing rules generated or obtained over a period of time that are associated with a specific serviced environment. For example, a given routing device may receive a plurality of routing rules over a period of time associated with a specific serviced environment. The rule processing system may then determine a set of paths corresponding to the serviced environment. The set of paths may be based on a model of the network architecture associated with the serviced environment. Further, the rule processing system may "statically" determine the set of paths based on the model without causing a routing device 104A, 104B, 108A, and 108B to transmit traffic to a destination. For example, the rule processing system may determine the set of paths without causing the routing devices 104A, 104B, 108A, and 108B to transmit network traffic (in contrast with "actively" determining the set of paths by transmitting network packets to various destinations to test whether various paths are feasible). Based on the set of routing rules and the set of paths, the rule processing system may identify excess routing rules and remove the excess routing rules from the set of routing rules for the particular routing device. Therefore, the rule processing system may manage the routing rules stored by each routing device 104A, 104B, 108A, and 108B.

Figure 2:
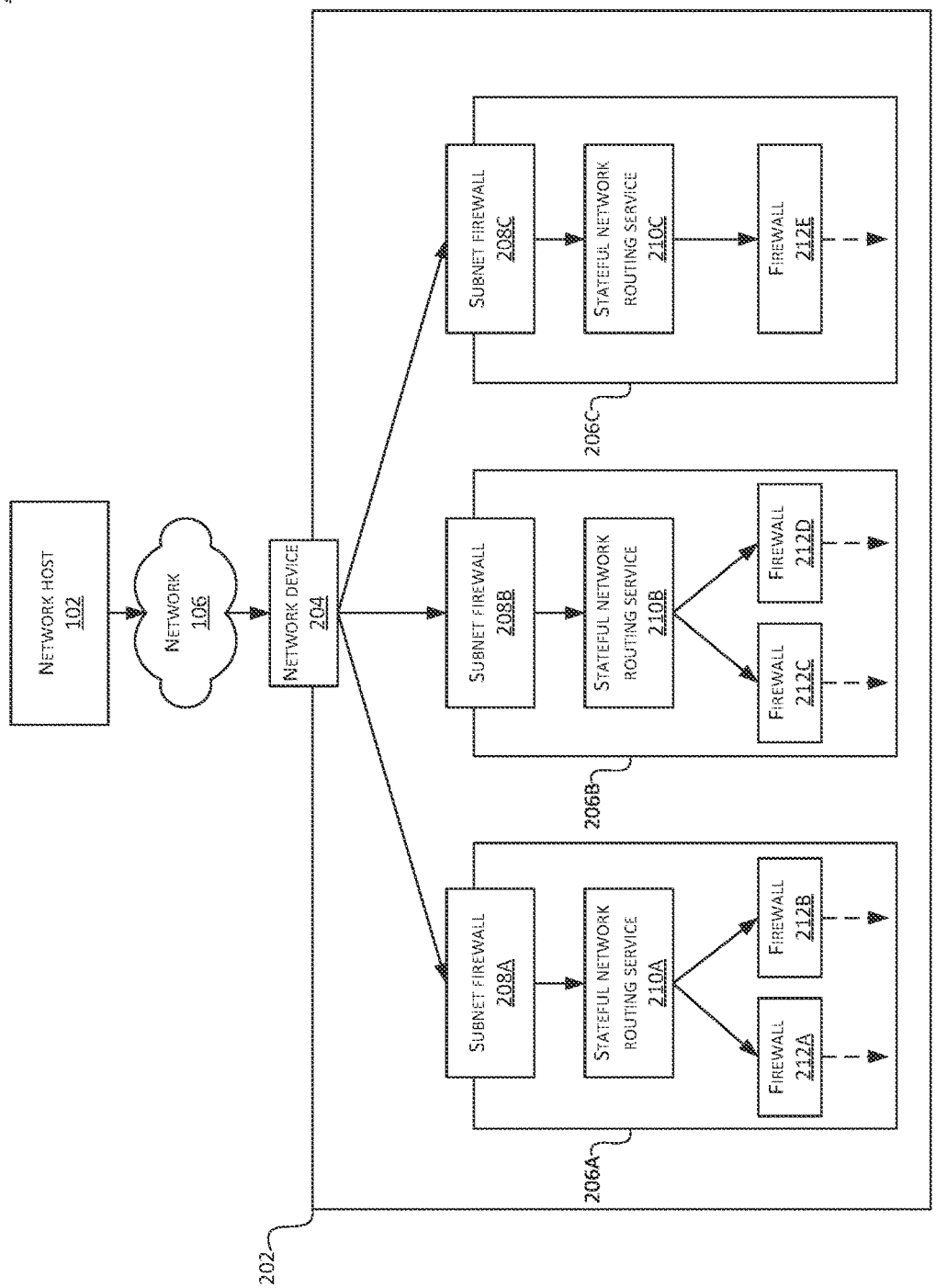
FIG. 2 depicts a schematic diagram of an example networked environment according to some embodiments.

FIG. 2 illustrates an example environment 200 in which a plurality of routing devices may be implemented according to some embodiments, enabling the routing of traffic to and/or from a serviced environment. As shown in FIG. 2, the example environment includes multiple routing devices including a network device 204, subnet firewalls 208A, 208B, and 208C, instances 210A, 210B, and 210C of a stateful network routing service, and firewalls 212A, 212B, 212C, 212D, 212E. The instances 210A, 210B, and 210C of a stateful network routing service illustratively correspond to instances of a stateful network routing service that exists within multiple availability zones, such as distributed across a number of regions. As shown in FIG. 2, the network device 204 can transmit and/or obtain packets via the network 106 to and/or from the network host 102. Further, the network device 204 can pass these packets to subnet firewalls 208A, 208B, and 208C. Each subnet firewall 208A, 208B, and 208C is distributed across and contained within multiple availability zones 206A, 206B, and 206C. Further, each subnet firewall 208A, 208B, and 208C may pass network traffic to corresponding instances 210A, 210B, and 210C of the stateful network routing service. The instances 210A, 210B, and 210C of the stateful network routing service are configured to obtain packets from a particular subnet firewall and pass those packets to a fleet of firewalls (designated as firewall 212A, 212B, 212C, 212D, 212E) for processing. For example, each availability zone 206A, 206B, and 206C may correspond to a particular subnet firewall, a particular instance of the stateful network routing service, and a particular set of firewalls. As discussed herein, the management of the routing rules stored at each routing device 204, 208A, 208B, 208C, 210A, 210B, 210C, 212A, 212B, 212C, 212D, and 212E ensures that network traffic is efficiently routed by the corresponding routing device.

The networked environment 200 includes a network host 102 and a virtual private environment 202 including a fleet of routing devices, which are in data communication with each other via a network 106 and network device 204. It will be understood that the networked environment 200 may include more, less, or a different number of routing devices that may be implemented in a horizontal or a vertical manner and in series or in parallel. The network host 102 may be associated with an end-user device (e.g., a device on-premises of a customer that is used to access the VPC). The virtual private environment 202 may be logically distributed among a plurality of availability zones 206A, 206B, and 206C, each of which represents a logically isolated network environment. In some embodiments, the virtual private environment 202 may be distributed across more or less availability zones. A logically isolated network environment may include a group of computing devices, network devices, and/or network appliances that are logically isolated from other groups of devices (e.g., the logically isolated network environment does not share a connection with another network environment). Each availability zone 206A, 206B, 206C may include a subnet firewall 208A, 208B, 208C, an instance 210A, 210B, 210C of a stateful network routing service, or a firewall 212A, 212B, 212C, 212D, 212E. In some embodiments, the network host 102 and the network device 204 may exist within the same availability zone (e.g., availability zone 206A, 206B, or 206C).

The virtual private environment 202 may correspond to a configurable pool of network resources that correspond to a client platform to perform one or more operations on the plurality of packets. The virtual private environment 202 may be a grouping of scalable resources for performing the operations. Further, the virtual private environment 202 may provide a number of network resources across a plurality of availability zones, each of which represents an isolated set of physical devices hosting such a zone. For example, the virtual private environment 202 may include a number of network resources in a first availability zone and a number of network resources in a second availability zone. The virtual private environment 202 may further isolate network traffic within the environment 202 from traffic external to the environment 202. For example, the virtual private environment 202 may correspond to a specific client and/or user and include a distinct set of IP addresses. The distinct set of IP addresses may correspond to a plurality of network appliances, network gateways, etc., operating within the environment 202.

As noted above, a serviced environment may require the performance of certain operations on network traffic. A network host 102 may transmit traffic to a destination and prior to the destination receiving the traffic, a routing device may perform the operations on the traffic. In order to implement these operations, a network device 204 may receive network traffic generated by the network host 102 via the network 106 and transmit it to the virtual private environment 202 for these operations. Illustratively in FIG. 2, the network device 204 may act as a network gateway for transmitting the network traffic from the network host 102 to the virtual private environment 202. In some embodiments, the virtualized private environment 202 may include the network device 204 separate from the instances 210A, 210B, and 210C of the stateful network routing service and the subnet firewalls 208A, 208B, and 208C. In other embodiments, the network 106 or another component otherwise separate from the virtual private environment 202 includes the network device 204. While described above as a component of the serviced environment of the host 102, the network device 204 may be a component of other networks, such as an 'edge router' controlling traffic into the serviced environment (which edge router may exist outside of the environment) or a gateway of other serviced environments.

The network device 204 may select a subnet firewall 208A, 208B, and 208C and/or an instance 210A, 210B, and 210C of the stateful network routing service and/or a firewall 212A, 212B, 212C, 212D, and 212E for the packet. Each subnet firewall 208A, 208B, and 208C may act as a firewall to control access to the availability zones 206A, 206B, and 206C. Based on the firewalling by the subnet firewalls 208A, 208B, 208C, each subnet firewall 208A, 208B, and 208C may transmit a portion of the network traffic to an instance 210A, 210B, and 210C of the stateful network routing service. Each instance 210A, 210B, and 210C of the stateful network routing service may further act as a network gateway for transmitting traffic to the firewalls 212A, 212B, 212C, 212D, and 212E. For example, an instance 210A, 210B, and 210C of the stateful network routing service may act as a gateway to transmit traffic from the network host 102 to the firewalls 212A, 212B, 212C, 212D, and 212E. Each firewall 212A, 212B, 212C, 212D, and 212E may perform firewalling operations on the traffic and, based on the firewalling operations, determine how to route the traffic (e.g., whether to route the traffic to a destination or drop the traffic).

Each subnet and/or availability zone 206A, 206B, 206C may further include a plurality of routing devices to route the packet to the proper destination. Each subnet and/or availability zone 206A, 206B, 206C may include a subnet firewall 208A, 208B, 208C, an instance 210A, 210B, 210C of the stateful network routing service, and a plurality of scalable firewalls 212A, 212B, 212C, 212D, 212E in order to perform routing, monitoring, and/or management functions on the packets. Each availability zone 206A, 206B, 206C may correspond to a unique subnet firewall, a unique instance of the stateful network routing service, and a unique set of firewalls. For example, availability zone 206A corresponds to subnet firewall 208A, instance 210A of the stateful network routing service, and firewalls 212A and 212B, availability zone 206B corresponds to subnet firewall 208B, instance 210B of the stateful network routing service, and firewalls 212C and 212D, and availability zone 206C corresponds to subnet firewall 208C, instance 210C of the stateful network routing service, and firewall 212E. In some embodiments, the virtual private environment 202 includes more or less availability zones and each availability zone may include more, less, or different routing devices.

Each routing device performs a routing, monitoring, and/or management operation on packets received by the particular routing device. Each routing device may further store a routing table (e.g., a collection of routing rules) that indicates how the routing device should route the packet. For example, the network device 204 may be a router, a load balancer, a firewall, or any other routing device. In some embodiments, the network device 204 may be a firewall that determines to drop or transmit traffic based on the routing table. In other embodiments, the network device 204 may be a load balancer or a router that determines a destination of the packet based on the routing table. Based on an associated routing table, the network device 204 may pass the packets to a corresponding subnet firewall 208A, 208B, 208C.

Each subnet firewall 208A, 208B, 208C may perform a firewalling operation on the packet. Each subnet firewall 208A, 208B, 208C may store a routing table that indicate whether the subnet firewall 208A, 208B, 208C should drop the packet or transmit the packet to an instance 210A, 210B, 210C of the stateful network routing service. Each instance 210A, 210B, and 210C of the stateful network routing service may select (e.g., perform load balancing) a firewall 212A, 212B, 212C, 212D, 212E to route a given path of network traffic. For example, where a path is defined by the source IP address and the destination IP address, the network device 204 may route traffic from the network host 102 and addressed to a particular destination to the same instance 210A, 210B, 210C of the stateful network routing service.

The selection of the firewall 212A, 212B, 212C, 212D, 212E may be based at least in part on a routing table associated with the instance 210A, 210B, 210C of the stateful network routing service. Further, the stateful network routing service, based on a particular set of network traffic, may route the path of network traffic to the same firewall 212A, 212B, 212C, 212D, 212E. Each firewall 212A, 212B, 212C, 212D, 212E may perform the same one or more operations on a packet received from the network host 102. The plurality of scalable firewalls 212A, 212B, 212C, 212D, 212E may correspond to a resilient managed service for a client associated with a network host 102. In some embodiments, the firewalls 212A, 212B, 212C, 212D, 212E may correspond to third party firewalls. The firewalls 212A, 212B, 212C, 212D, 212E may be scalable according to desired performance (e.g., throughput, number of paths, paths per second, etc.) and, in some cases, may be elastically scalable. For example, an instance 210A, 210B, 210C of the stateful network routing service can change the quantity of firewalls 212A, 212B, 212C, 212D, 212E as network traffic volume changes and as the network traffic volume increases or decreases, an instance 210A, 210B, 210C of the stateful network routing service can add the firewalls 212A, 212B, 212C, 212D, 212E to the quantity of firewalls or remove the firewalls 212A, 212B, 212C, 212D, 212E from the quantity of firewalls. Network traffic may further be automatically rerouted to a healthy firewall 212A, 212B, 212C, 212D, 212E in the event that a firewall is unhealthy and/or otherwise unavailable. The firewalls 212A, 212B, 212C, 212D, 212E may then drop or transmit a packet to the destination of the packet based on a routing table associated with the firewalls 212A, 212B, 212C, 212D, 212E.

Figure 3:
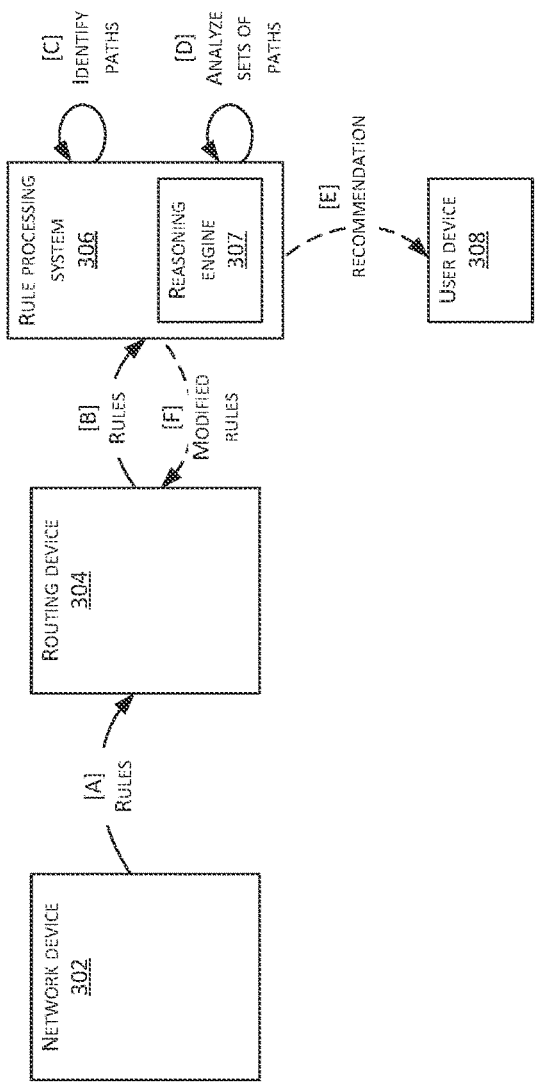
FIG. 3 depicts an example workflow for providing simplified routing rules according to some embodiments.

FIG. 3 illustrates an environment 300 in which a user and/or a system may implement a rule processing system 306 according to some embodiments. The rule processing system 306 may manage configuration settings associated with a routing device 304, such as a routing table. The routing device 304 may receive the routing table from a network device 302 and transmit the routing table to the rule processing system 306 for processing. Although some examples herein refer to a specific type of device as being the network device 302 or the routing device 304, the examples are illustrative only and are not intended to be limiting, required, or exhaustive. The network device 302 may be any type of computing device (e.g., a server, a node, a router, a network host, etc.). Further, the routing device 304 may be any type of routing device (e.g., a load balancer, a router, a firewall, etc.). Moreover, the configuration settings may be settings other than a routing table, such as an access control list ("ACL"), network address translation ("NAT") mappings, or the like.

With reference to an illustrative embodiment, a network device 302 may determine a routing table associated with a particular routing device 304. The network device 302 may provide the routing table to the routing device 304 and the routing device 304 may store the routing table such that the routing device 304 routes network traffic incoming to the routing device 304 based on the routing table. The routing device 304 may further pass the routing table to the rule processing system 306. The rule processing system 306 may receive the routing table provided by the routing device 304 for rule management. In some embodiments, the rule processing system 306 is integrated with one or more of the routing device 304 or the network device 302.

The rule processing system 306 may include a reasoning engine 307 to identify a set of feasible paths for a particular collection of routing rules and, based on the set of feasible paths, determine excess routing rules. The reasoning engine 307 may generate and/or analyze models of the network architecture to determine the excess routing rules. The reasoning engine 307 may be a datalog solver, an SMT solver, a first-order theorem prover, or any other reasoning engine. Further, each reasoning engine may correspond to a particular encoding of the network semantics.

The rule processing system 306 may process the routing table to determine changes to be made to routing rules of the routing table, such as the removal of redundant or other "excess" routing rules, the simplification of lenient rules, the removal of unused rules, the addition of new rules, etc. The rule processing system 306 may receive a single network configuration (e.g., a network snapshot, a network specification, a set of routing rules) and encode the network configuration. Based on the encoding of the network configuration, the reasoning engine 307 may identify a set of paths between endpoints of the network. The reasoning engine 307 may identify multiple sets of paths between endpoints of the network in order to identify sub-optimal routing rules. In some embodiments, the reasoning engine 307 may receive multiple network configurations and encode the multiple network configurations. Further, the reasoning engine 307 may directly analyze the multiple network configurations to determine if there any differences between the paths associated with the network configurations. For example, the reasoning engine may directly analyze a first network configuration and a second network configuration to determine if there any differences between the paths of the first network configuration and the paths of the second network configuration. Based on the analysis of the multiple network configurations, the reasoning engine 307 can indicate differences between the first network configuration and the second network configuration. Based on these determined differences, the rule processing system 306 may modify the routing table to generate a modified routing table. The rule processing system 306 may then pass the modified routing table to the routing device 304. The routing device 304 may receive the modified routing table and replace the routing table with the modified routing table. Further, the routing device 304 may use the modified routing table in routing subsequent network traffic.

In various examples, the network device 302, the routing device 304, the rule processing system 306, and/or the reasoning engine 307 may transmit the routing table and/or the modified routing table over one or more networks (not shown in FIG. 3). The one or more networks may include any viable communication technology, such as wired and/or wireless modalities and/or technologies. The one or more networks may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. Any of the one or more networks may include, and/or may or may not have access to and/or from, the internet.

At [A], the network device 302 provides a collection of routing rules (e.g., a routing table) to the routing device 304. The network device 302 may provide the collection of routing rules in response to a query by the routing device 304. In some implementations, the network device 302 may provide the collection of routing rules based on an initialization of the routing device 304. Based upon receiving the collection of routing rules, the routing device 304 may store the collection of routing rules in a corresponding data store. The routing device 304 may then use the collection of routing rules in order to make routing decisions with regards to subsequent network traffic. Further, the network device 302 may provide updates to the collection of routing rules stored by the routing device 304. The updates to the collection of routing rules may correspond to an updated routing rule. In some embodiments, the updates to the collection of routing rules may correspond to a modified collection of routing rules. Based upon receiving the updated routing rules, the routing device 304 may modify the stored collection of routing rules by adding, deleting, or otherwise modifying the collection of routing rules. In other embodiments, the routing device 304 may replace the stored collection of routing rules with the updated collection of routing rules. For example, the routing device 304 may store the collection of routing rules in a data store associated with the routing device 304 and based upon receiving an updated collection of routing rules, the routing device may replace the stored collection with the updated collection. In some implementations, the routing device 304 may not receive the collection of routing rules from the network device 302 and may generate and/or obtain the collection of routing rules. For example, the routing device 304 may determine the collection of routing rules for the routing device. In other implementations, the network device 302 may periodically provide an update to the collection of routing rules (e.g., every minute, every hour, every day, etc.).

At [B], the routing device 304 provides the collection of routing rules to the rule processing system 306. The routing device 304 can receive the collection of routing rules from the network device 302 and store the collection of routing rules in an associated data store. The routing device 304 may perform one or more operations on the collection of routing rules. For example, the routing device 304 may convert the collection of routing rules into a particular data format. The routing device 304 may then send the collection of routing rules to the rule processing system 306. The routing device 304 may periodically send the collection of routing rules to the rule processing system 306 (e.g., every minute, hour, day, etc.). In some implementations, the routing device 304 may send the collection of routing rules to the rule processing system 306 based upon receiving a collection of routing rules (either a new collection or an updated collection) from the network device 302. In other implementations, the routing device 304 may send the collection of routing rules based upon receiving a request from the rule processing system 306 for the collection of routing rules. In some implementations, the routing device 304 may send the collection of routing rules as a collection of field value pairs. For example, the collection of routing rules may include a rule field and a rule field value and a source field and a source field value for each routing rule. In some implementations, the routing device 304 may send a formal specification and/or a snapshot corresponding to the routing device 304 to the rule processing system 306. The formal specification may include the semantics of the network architecture associated with the routing device 304. For example, the formal specification details how the routing device routes traffic. Further, the snapshot may describe the topology and details of the network. For example, the snapshot details the routing devices, the environments, the route tables, the routing rules, etc. associated with a serviced environment. The rule processing system 306 may combine the formal specification and the snapshot in order to determine a set of paths associated with the serviced environment. In some embodiments, the network architecture associated with the routing device 304 may include multiple routing devices and each routing device may send an associated collection of routing rules to the rule processing system 306. Therefore, the rule processing system 306 may receive a collection of routing rules from each routing device.

At [C], the reasoning engine 307 of the rule processing system 306 identifies a set of paths (e.g., a set of feasible paths) corresponding to the network architecture associated with the routing device 304 and the collection of routing rules associated with the routing device 304. The reasoning engine 307 may identify paths corresponding to the collection of routing rules by building a model of the network architecture associated with the routing device 304. The model of the network architecture may include a representation of the different components of the network architecture (e.g., the routing devices, the environments, the routing tables, the routing rules, etc.) that are included in the network architecture. Based on the formal specification and the snapshot, the reasoning engine 307 or some other module or component of the rule processing system 306 may build the model of the network architecture such that the model identifies the manner in which network traffic is transmitted in the network architecture (e.g., the model identifies—or is used to identify—the set of feasible paths). By using the model of the network architecture, the reasoning engine 307 statically identifies the set of paths of the network architecture. Further, the reasoning engine 307 determines the set of paths without causing the routing device 304 to transmit network traffic to a destination and/or receive network traffic from the destination. Therefore, using the model of the network architecture, the reasoning engine 307 identifies the set of paths associated with the network architecture.

At [D], the rule processing system 306 analyzes the identified set of paths corresponding to the collection of routing rules with a second set of paths corresponding to a second collection of routing rules. In some embodiments, the rule processing system 306 may modify the collection of routing rules (e.g., remove, modify, change, add, etc. one or more routing rules of the collection of routing rules) to generate a second collection of routing rules. The rule processing system 306 may further identify the second set of paths corresponding to the second collection of routing rules by building a second model of the network architecture corresponding to the second collection of routing rules. The reasoning engine 307 may further use the second model of the network architecture to statically identify the second set of paths of the network architecture. In order to identify excess routing rules, the rule processing system 306 may compare the set of paths and the second set of paths to determine if there are differences between the two sets of paths. The rule processing system 306 may determine that one or more differences exist between the sets of paths (e.g., a path from the first set of paths is missing from the second set of paths, a path that was missing from the first set of paths is included in the second set of paths, no new paths are possible). The rule processing system 306 may determine whether the set of paths and the second set of paths meet a similarity threshold. For example, the rule processing system 306 may determine whether the set of paths and the second set of paths are identical, equivalent (e.g., not necessarily identical but providing the same connectivity), substantially similar, within a certain range of similarity, etc. In some embodiments, the rule processing system 306 may require that the set of paths and the second set of paths include the same paths. Based on determining that the set of paths and the second set of paths are substantially similar, the rule processing system 306 may provide the modified collection of routing rules to the routing device 304. In some embodiments, the rule processing system 306 may further modify the modified collection of routing rules. For example, the rule processing system 306 may remove or modify additional rules. This process may be iteratively repeated any number of times until the modified collection of routing rules achieves a desired size or provides the desired results. In some embodiments, the reasoning engine 307 may perform the analysis of the sets of paths.

In other embodiments, the rule processing system 306 may build a first model based on the collection of routing rules and a second model based on a second collection of routing rules. The second collection of routing rules may be a modified version of the collection of routing rules. For example, a routing rule of the collection of routing rules may be absent from the second collection of routing rules. Further, the reasoning engine 307 may compare the first model and the second model and analyze the models to directly produce a list of any differences in the possible paths. In some embodiments, the reasoning engine 307 may generate a model (or directly generate a collection of routing rules that would correspond to a model) that would result in a desired set of paths. For example, a user may provide a desired set of paths, or a desired set of paths may be derived from analysis of network traffic. The reasoning engine 307 may use the desired set of paths to directly generate a modified collection of routing rules.

In some embodiments, at [E], the rule processing system 306 may provide a recommendation to a user via an interface, such as via a user device 308. The rule processing system 306 may recommend that the user modify the collection of routing rules based on the modified collection of routing rules. In some embodiments, the rule processing system 306 may request that the user accept the modifications to the collection of routing rules. Based on the user accepting the modifications to the collection of routing rules, the rule processing system 306 may provide the modified collection of routing rules to the routing device 304 and the routing device 304 may route the network traffic based on the modified collection of routing rules. In other embodiments, the rule processing system 306 may cause a user interface to be presented to the user that allows the user to modify the collection of routing rules.

In some embodiments, at [F], the rule processing system 306 may respond to the routing device 304 by providing the modified collection of routing rules to the routing device 304. Based on receiving the modified collection of routing rules, the routing device 304 may store the modified collection in the data store associated with the routing device 304. Upon receiving subsequent network traffic, the routing device 304 may route the network traffic according to the modified collection of routing rules. Therefore, the rule processing system 306 provides the modified collection of routing rules to the routing device 304 for subsequent use in routing network traffic.

The rule processing system 306 may further receive additional routing rules after generating the modified collection of routing rules. The additional routing rules may correspond to additional routing rules added to the collection of routing rules stored by the routing device 304. The rule processing system 306 may determine a subsequent modified collection of routing rules based at least in part on the additional routing rules.

Figure 4A:
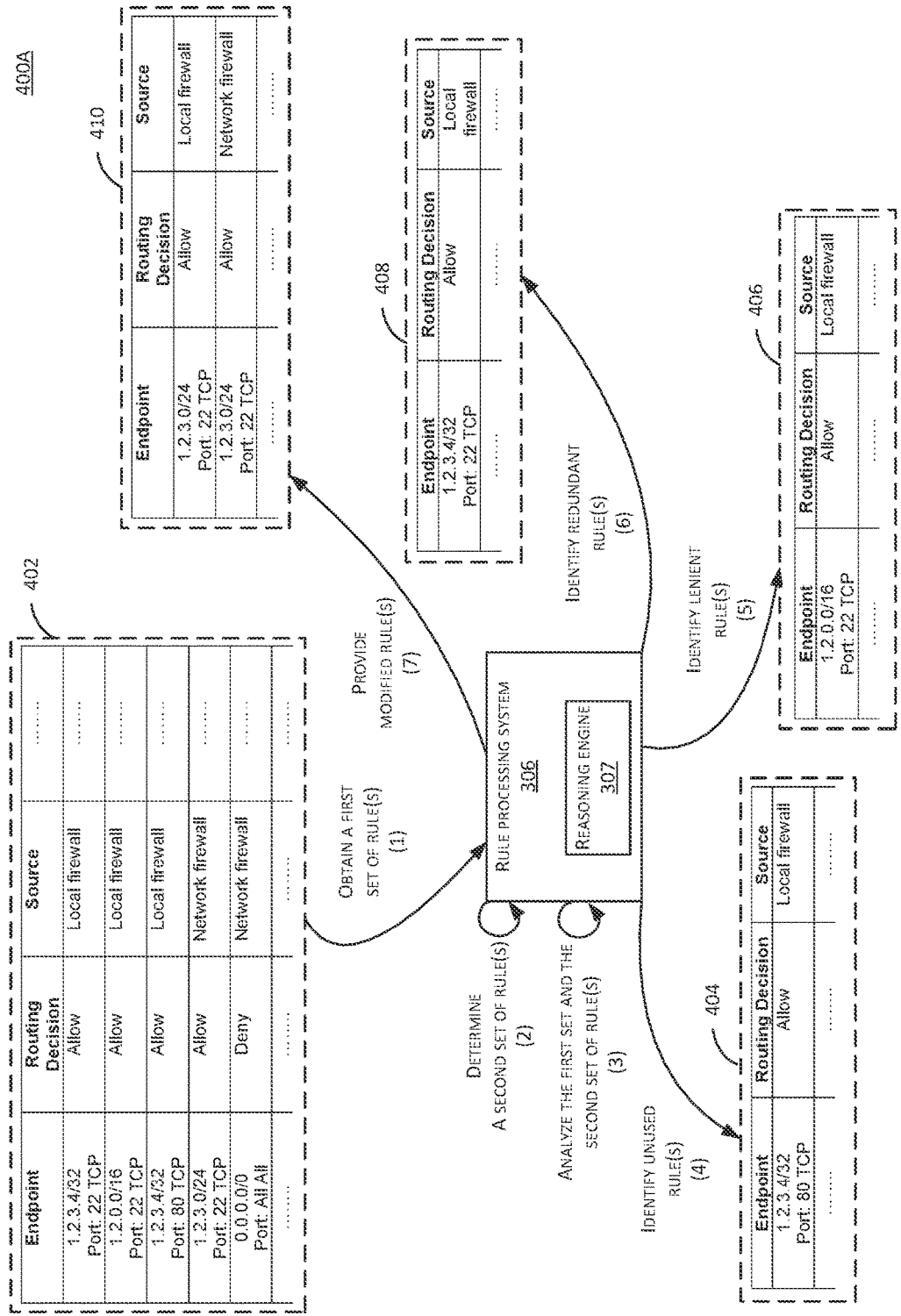
FIG. 4A depicts an example workflow for determining simplified routing rules in an example networked environment.

FIG. 4A depicts an example workflow 400A for a rule processing system 306 updating a collection of routing rules for a routing device in accordance with aspects of the present disclosure. The rule processing system 306 may periodically update the collection of routing rules. In some embodiments, a computing device may initiate the rule processing system 306 to update the collection based on one or more events (e.g., a new routing device initiated in the network architecture, on demand by a customer, etc.).

As shown in FIG. 4A at (1), the rule processing system 306 obtains a set of configuration settings, such as a first set of routing rules 402. In some embodiments, the first set of routing rules 402 may correspond to multiple routing tables. For example, the first set of routing rules 402 may include routing tables that correspond to different routing devices (e.g., a first plurality of the routing rules of the set of routing rules may correspond to a first routing device and a second plurality of the routing rules of the set of routing rules may correspond to a second routing device). The first set of routing rules 402 may be based on the routing devices that correspond to or are associated with a given network architecture. For example, the network architecture may correspond to a network host in communication with a first firewall and a second firewall and the first set of routing rules 402 may include routing rules associated with the first firewall and routing rules associated with the second firewall. The first set of routing rules 402 may include any number of routing rules and may correspond to any number of routing devices. The rule processing system 306 may determine that a given routing device is associated with a given network architecture and obtain routing rules from the routing device. In some embodiments, each routing device associated with a given network architecture may provide routing rules associated with the network architecture periodically to the rule processing system 306.

In the example of FIG. 4A, the first set of routing rules includes endpoint entries "1.2.3.4/32 Port: 22 TCP," "1.2.0.0/16 Port: 22 TCP," "1.2.3.4/32 Port: 80 TCP," "1.2.3.0/24 Port: 22 TCP," and "0.0.0.0/0 Port: All All" and each endpoint entry is associated with a particular routing decision "Allow," "Allow," "Allow," "Allow," and "Deny" and a particular source "Local firewall," "Local firewall," "Local firewall," "Network firewall," and "Network firewall." Each endpoint entry may indicate a certain endpoint (e.g., a source and/or destination of network traffic). In the example of FIG. 4A, the endpoint is an IP address and a port address. In some embodiments, the endpoint may be or may include any other network address. Each routing decision may indicate how the routing device should route traffic associated with the endpoint. For example, the routing decision may indicate the routing device should allow, deny, load balance, or otherwise route the network traffic. In order to properly route traffic from a source to a destination, each source may indicate a routing device that stores the corresponding routing rule. For example, a source may indicate that a first firewall or a second firewall stores a routing rule for a given path of network traffic and, upon receiving traffic corresponding to the path of network traffic, the firewall may apply the routing rule to the network traffic. In some implementations, the first set of routing rules 402 can include more or less information and may correspond to more or less routing rules and/or routing devices.

At (2), the rule processing system 306 determines a second set of routing rules. The second set of routing rules may be a modified version of the first set of routing rules 402. For example, the rule processing system 306 may remove, modify, add, etc. routing rules in the first set of routing rules 402 to generate the second set of routing rules.

At (3), the rule processing system 306 analyzes the first set of routing rules and the second set of routing rules in order to determine one or more excess routing rules of the first set of routing rules 402. In order to determine the one or more excess routing rules, the rule processing system 306 may determine a set of paths for the first set of routing rules 402. As will be further explained in FIG. 4B, the reasoning engine 307 may obtain a formal specification and a snapshot associated with the network architecture. Based on the formal specification and the snapshot, the reasoning engine 307 or some other module component of the rule processing system 306 may build a model of the network architecture. The model of the network architecture may include the components of the network architecture (e.g., a source, a destination, routing devices) and the specifications associated with each. Based on the model of the network architecture, the reasoning engine 307 may identify a set of paths that indicate paths of network traffic in the network architecture based on the first set of routing rules 402. For example, the set of paths may identify paths that network traffic may take in the network architecture. As the set of paths is identified using the model of the network architecture, the reasoning engine 307 may determine the possible paths without causing the routing device to transmit network traffic to a destination of the network traffic. Therefore, the reasoning engine 307 determines all possible paths for the network architecture.

The rule processing system 306 may further generate a second model of the network architecture based on the second set of routing rules. Based on the second model of the network architecture, the reasoning engine 307 may identify a second set of paths that indicate paths of network traffic in the network architecture based on the second set of routing rules. The rule processing system 306 may compare the set of paths to the second set of paths to determine if the sets of paths are substantially similar (e.g., the set of paths are within a desired range of similarity). Based on determining that the sets of paths are within the desired range of similarity, the rule processing system 306 may identify one or more excess routing rules of the first set of routing rules 402. The one or more excess routing rules of the first set of routing rules 402 may be routing rules that were modified (e.g., added, removed, modified, etc.) to generate the second set of routing rules.

In some embodiments, the rule processing system 306 may generate any number of sets of routing rules by modifying any combination of routing rules from the first set of routing rules 402. The rule processing system 306 may use the generated sets of routing rules to iteratively—or in parallel—generate any number of network models that may be analyzed as described above to determine similarities and/or differences in feasible paths with respect to the feasible paths associated with the model of the network as it is currently configured and/or any other possible configuration of the network. Using one or more of such iteratively generated sets of routing rules, models, and/or sets of feasible paths, the rule processing system 306 may determine one or more excess routing rules. In the example of FIG. 4A, unused, lenient, and redundant rules are identified as the one or more excess routing rules. In some embodiments, more, less, or different routing rules may be the one or more excess routing rules. Further, the definition of an excess routing rule, an unused routing rule, a lenient routing rule, and/or a redundant rule may be different.

At (4), the rule processing system 306 may identify unused routing rules 404. The rule processing system 306 may identify unused routing rules 404 by identifying routing rules of the first set of routing rules 402 that are not included in the set of possible paths identified by the rule processing system 306. The unused routing rules 404 may be routing rules that do not correspond to actual network traffic. For example, the unused routing rules 404 may identify endpoints that are not possible in the given network architecture (e.g., where a first routing device drops all traffic to a certain destination, a second routing device that receives traffic from the first routing device may not use a routing rule that allows traffic to the certain destination). As the unused routing rules 404 are unused by the routing device, the rule processing system 306 removes the unused routing rules 404 from the set of routing rules. Further, as these routing rules were unused, the removal of the unused routing rules 404 from the first set of routing rules 402 does not affect routing by the routing device.

In the example of FIG. 4A, the rule processing system identifies one routing rule as an unused routing rule 404. The unused routing rule 404 may correspond to endpoint "1.2.3.4/32 Port: 80 TCP," routing decision "Allow," and source "Local firewall." The rule processing system 306 may identify unused routing rule 404 as unused because all network traffic allowed by this routing rule is rejected by the second firewall. In some implementations, the first set of routing rules 402 may include more or less unused routing rules 404.

At (5), the rule processing system 306 may identify lenient routing rules 406. The rule processing system 306 may identify lenient routing rules 406 by identifying routing rules of the first set of routing rules 402 that the rule processing system 306 can modify without affecting or infringing the possible paths identified by the rule processing system 306. The lenient routing rules 406 may be routing rules that cover network traffic (as determined by the set of paths) and additional traffic not covered by the set of paths. For example, the lenient routing rules 406 may identify a range of endpoints that includes some endpoints that are possible in the given network architecture and some endpoints that are not possible in the given network architecture. As the lenient routing rules 406 identify network traffic not covered by the possible paths, the rule processing system 306 may modify the lenient routing rules 406 to cover only traffic covered by the set of paths. Further, as these routing rules were lenient, the removal of the lenient routing rules 406 from the first set of routing rules 402 does not affect routing by the routing device.

In the example of FIG. 4A, the rule processing system identifies one routing rule as a lenient routing rule 406. The lenient routing rule 406 may correspond to endpoint "1.2.0.0/16 Port: 22 TCP," routing decision "Allow," and source "Local firewall." The rule processing system 306 may identify lenient routing rule 406 as lenient because a portion of the network traffic allowed by this routing rule is rejected by the second firewall and a portion of the network traffic allowed by this routing rule is allowed by the second firewall. In some implementations, the first set of routing rules 402 may include more or less lenient routing rules 406.

At (6), the rule processing system 306 may identify redundant routing rules 408. The rule processing system 306 may identify redundant routing rules 408 by identifying routing rules of the first set of routing rules 402 that cover the same network traffic as another routing rule of the first set of routing rules 402. The redundant routing rules 408 may identify a set of routing rules that include the same routing decision for the same portion of network traffic. For example, a first routing rule and a second routing rule of the first set of routing rules 402 may cover the same portion of network traffic and include the same routing decision for the same portion of network traffic. Based on this identification, the rule processing system 306 may identify one or more of the first routing rule and the second routing rule as redundant routing rules 408. As the redundant routing rules 408 identify network traffic covered by another routing rule, the rule processing system 306 may remove the redundant routing rules 408 without affecting routing by the routing device.

In the example of FIG. 4A, the rule processing system identifies one routing rule as a redundant routing rule 408. The redundant routing rule 408 may correspond to endpoint "1.2.3.4/32 Port: 22 TCP," routing decision "Allow," and source "Local firewall." The rule processing system 306 may identify the redundant routing rule 408 as redundant because all network traffic allowed by this routing rule is allowed by the routing rule that corresponds to endpoint "1.2.0.0/16 Port: 22 TCP," routing decision "Allow," and source "Local firewall." In some implementations, the first set of routing rules 402 may include more or less redundant routing rules 408.

At (7), the rule processing system 306 provides the modified set of routing rules 410 to the routing device. The modified routing rules may exclude the one or more excess routing rules identified by the rule processing system 306. In some embodiments, the rule processing system 306 may include a modified version of an excess routing rules in the modified routing rules 410. For example, the rule processing system 306, in generating the modified routing rules 410, may remove redundant routing rules 408 and unused routing rules 404 and modify the lenient routing rules 407 to cover only traffic corresponding to possible paths identified by the rule processing system. In the example of FIG. 4A, the rule processing system identifies a set of modified routing rules 410 that includes routing rules for the first firewall and routing rules for the second firewall. The modified routing rules 410 may correspond to endpoint "1.2.3.0/24 Port: 22 TCP," routing decision "Allow," and source "Local firewall" and endpoint "1.2.3.0/24 Port: 22 TCP," routing decision "Allow," and source "Network firewall." Each routing device may store the same routing rule. In some embodiments, each routing device may store different routing rules. Each routing device may store the portion of the modified rules 410 corresponding to the particular routing device. Further, each routing device may use the corresponding portion of the modified rules 410 in determining how to route subsequent network traffic. In the example of FIG. 4A, the first firewall and the second firewall may allow all traffic to endpoint "1.2.3.0/24 Port: 22 TCP."

In some embodiments, in order to identify excess routing rules, the reasoning engine can generate a two-dimensional map of network addresses (e.g., IP addresses and ports). For example, the X axis may range from 0 to 255.255.255.255 and the Y axis may range from 0 to 65535. The reasoning engine may represent each routing rule as a shape within the two-dimensional map. For example, a particular routing rule may correspond to a rectangle within the two-dimensional map. The reasoning engine may determine that a particular network address is allowed if the address within the two-dimensional map corresponds to a shape (e.g., a routing rule). The reasoning engine may further determine that a particular network address is not allowed if the address within the two-dimensional map does not correspond to a shape. Further, the reasoning engine may identify excess routing rules based on the two-dimensional map. For example, a routing rule may be redundant if a shape corresponding to the routing rule is covered by other shapes within the two-dimensional map.

Figure 4B:
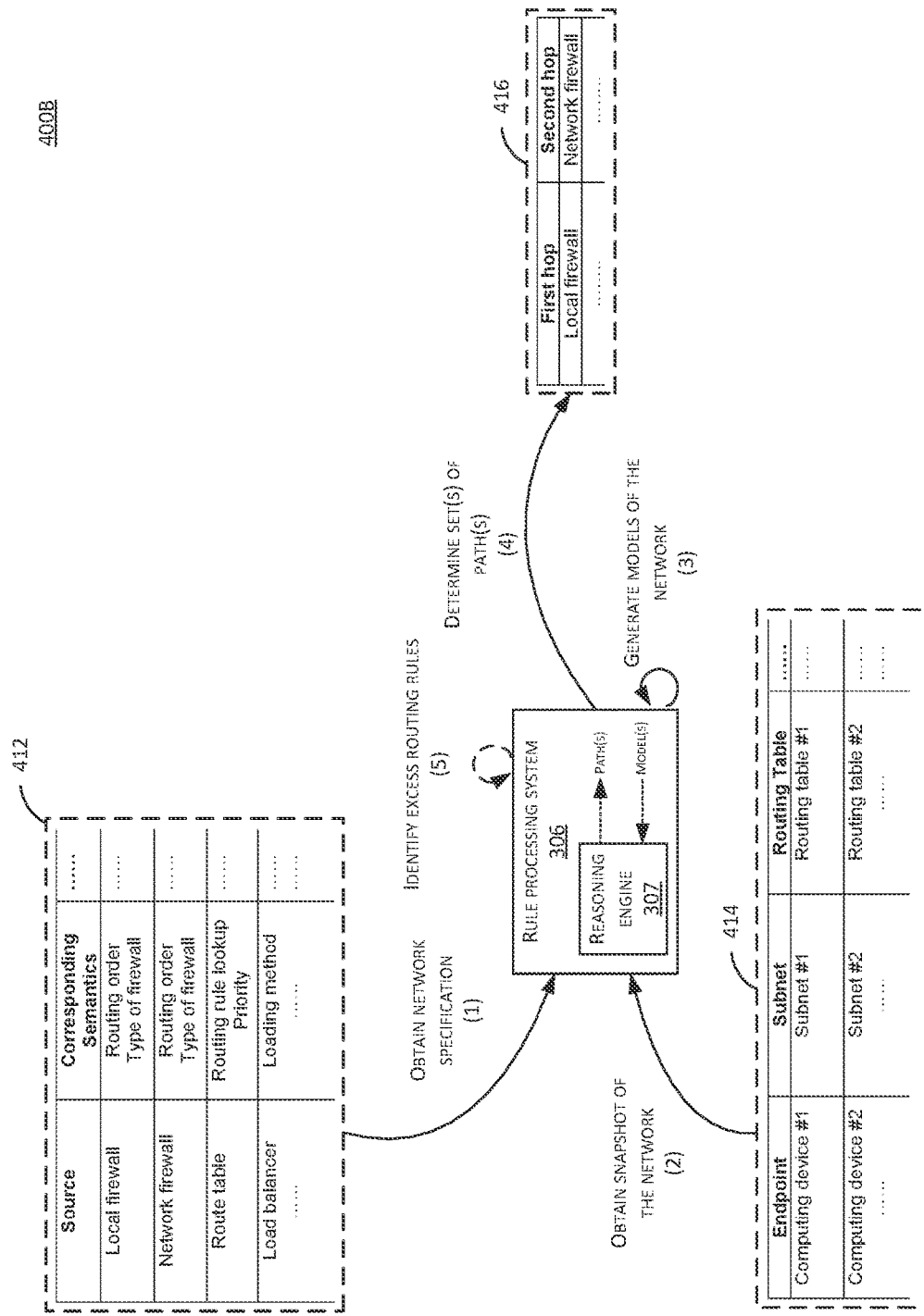
FIG. 4B depicts an example workflow for determining possible paths in an example networked environment.

FIG. 4B depicts an example workflow 400B for a rule processing system 306 analyzing a first set of routing rules and a second set of routing rules in accordance with aspects of the present disclosure. The rule processing system 306 may periodically analyze the first set of routing rules and an additional set of routing rules or may periodically update the second set of routing rules.

In order to analyze the first set of routing rules and the second set of routing rules, as shown in FIG. 4B at (1), the reasoning engine 307 or some other module or component of the rule processing system 306 obtains the network specification 412 corresponding to a particular network architecture. The network specification 412 may provide semantics of the components of the network architecture (e.g., the network specification may illustrate how components operate). For example, the network specification 412 may illustrate how a route table directs traffic from an availability zone, the order in which a firewall applies routing rules, or how load balancers balance network traffic. The network specification 412 may illustrate how each device (e.g., each routing device) of the network architecture operates. In some embodiments, the network specification 412 may include more or less information. For example, the network specification 412 may include universally applicable information that covers multiple network architectures. In other embodiments, the network specification 412 may be specific to a particular network architecture. For example, the network specification 412 may contain material specific to the particular network architecture. In the example of FIG. 4B, the network specification 412 includes source "first firewall," "second firewall," "route table," and "load balancer" that are each associated with corresponding semantics "routing order, type of firewall," "routing order, type of firewall," "routing rule lookup, priority" and "loading method." Each source may indicate a type of component and each set of corresponding semantics may list semantics for the particular type of component. In some embodiments, a certain type of component may have different semantics in different situations or different network architectures.

At (2), the reasoning engine 307 or some other module or component of the rule processing system 306 obtains a snapshot 414 of the network corresponding to a particular network architecture. The snapshot 414 may describe the topology and/or details of the network. For example, the snapshot 414 may describe the computing devices, routing devices, availability zones, route tables, etc. that are associated with a specific network architecture. In the example of FIG. 4B, the snapshot 414 includes endpoint "computing device #1" and "computing device #2" that are each associated with a corresponding subnet "subnet #1" and "subnet #2" and a corresponding routing table "routing table #1" and "routing table #2." Each endpoint may indicate a source or destination of network traffic. Each subnet may indicate an availability zone of the endpoint. Each routing table may indicate how traffic may travel to a particular endpoint. For example, routing table #1 may indicate that computing device #1 can route traffic to computing device #2 through network device #1 and then through instance #1 of the stateful network routing service and then through one of firewall #1, #2, or #3 before being transmitted to the computing device #2. Each endpoint may correspond to such a routing table such that the rule processing system 306 can determine the set of possible paths to and/or from the endpoint.

At (3), the reasoning engine 307 or some other module or component of the rule processing system 306 generates models of the network based on the network specification 412 and the snapshot 414. The rule processing system 306 may generate a first model based on the first set of routing rules and a second model based on the second set of routing rules. In some embodiments, the reasoning engine 307 may generate more, less or different models. The reasoning engine 307 may determine or obtain the models based on the network specification 412 and the snapshot 414 and may analyze a particular model of the network in order to illustrate how network traffic may travel between multiple endpoints. In some embodiments, the reasoning engine 307 may construct the models of the network based on the network specification 412 and the snapshot 414. Therefore, the rule processing system 306 may use the reasoning engine to generate the models.

At (4), the reasoning engine 307 determines set(s) of paths 416 based on a model of the network. The reasoning engine 307 may analyze the model of the network in order to determine how traffic can travel to/from a particular endpoint. The way in which traffic can travel to and/or from a particular endpoint may indicate a possible path of the network traffic. In the example of FIG. 4B, the set of paths 416 includes a first hop "first firewall" and a second hop "second firewall." The set of paths 416 may correspond to a particular path to an endpoint associated with the network architecture. Each endpoint may correspond to one or more possible paths 416. In some embodiments, a path 416 may correspond to multiple endpoints. The reasoning engine 307 may determine a second set of paths based on a second model of the network for comparison with a first set of paths 416. Therefore, the reasoning engine 307 can compare the second set of paths with the first set of paths to determine if the sets of paths share a desired level of similarity. In some embodiments, the reasoning engine 307 may provide an indication to a user of the differences in paths between the first set of paths and the second set of paths. For example, the reasoning engine 307 may compare the first model and the second model and analyze the models to directly produce a set of paths, the set of paths corresponding to any differences in the paths for the first model and the paths for the second model.

In some embodiments, the set of possible paths 416 may be generated in a variety of different formats. For example, the set of possible paths 416 may be a list or collection of records, as illustrated in FIG. 4B. As another example, the set of possible paths 416 may be represented as a graph in which endpoints and intermediate network devices (routers, firewalls, etc.) are represented as nodes, and paths (or segments of paths) are represented as edges. The particular format in which the set of possible paths 416 is generated may depend on the particular rule processing system 306 and/or the particular reasoning engine 307, or on a subsystem thereof. For example, some rule processing systems 306 may include multiple model analysis subsystems. Each subsystem—or subsets thereof—may generate output, such as a set of possible paths 416, in a different format. In some embodiments, each subsystem—or subsets thereof—may take, as input, a network model that represented in a different format.

In some embodiments, at (5), the rule processing system 306 may identify excess routing rules based on the first set of paths and the second set of paths. Based on determining that the sets of paths share a desired level of similarity, the rule processing system 306 can identify one or more excess routing rules from a first set of routing rules. For example, as the first set of paths and the second set of paths share the desired level of similarity, the rule processing system 306 may identify rules of the first set of routing rules that are modified or not present in the second set of routing rules as excess routing rules. Therefore, the rule processing system 306 may analyze the first set of routing rules and the second set of routing rules in order to determine one or more excess routing rules. The rule processing system 306 and the reasoning engine 307 may repeat the process of FIG. 4B any number of times.

Figure 5:
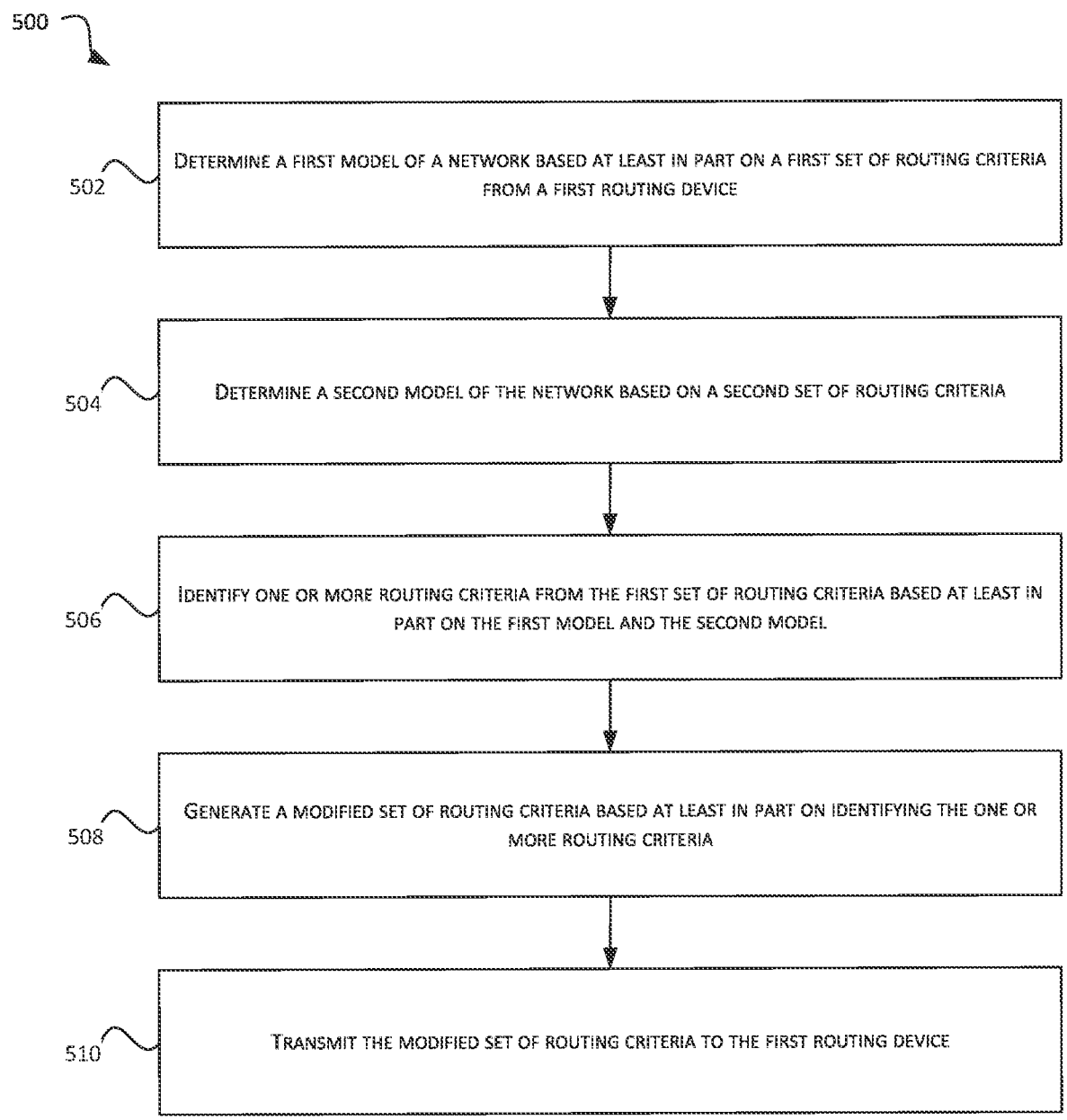
FIG. 5 is a flowchart of an example routine for identifying excess routing criteria and established a modified set of routing criteria.

FIG. 5 describes an illustrative process 500 for managing routing rules at a particular routing device. The process 500 includes identifying a set of possible paths in a network architecture using a model of the network architecture. By using such a model, a computing device may manage the routing rules without causing the transmission of data by a routing device to a destination.

The process 500 begins at block 502. The process 500 may begin automatically upon initiating a routing device. For example, a client or end-user may request the initialization of a routing device. The process 500 may be embodied in a set of executable program instructions stored on a computer-readable medium, such as one or more disk drives, of a computing system of a node or a server. When the process 500 is initiated, the executable program instructions can be loaded into memory, such as random access memory ("RAM"), and executed by one or more processors of a computing system. Upon initiation of the process, at block 502, a computing device executing the process 500 (e.g., the rule processing system 306) determines a first model of a network based at least in part on a first set of routing criteria from a first routing device. For example, the first routing device may provide the first set of routing criteria to the computing device. The first routing device may correspond to a local firewall, a network firewall, a network device, a network address translation device, a router, a stateless network routing service, a network device, or any other routing device. The first set of routing criteria may correspond to one or more of a set of routing rules, a routing table, a set of security access rules, a set of firewall rules, or any other routing criteria. Further, the first set of routing criteria may correspond to a routing table stored by the first routing device and used by the first routing device to determine how to transmit traffic received by the first routing device. The first routing device may route network traffic to a plurality of network devices based at least in part on the first set of routing criteria. Further, each routing criteria of the first set of routing criteria may correspond to a validation or a rejection of a particular network device and the first routing device may drop packets addressed to a rejected network device and transmit packets addressed to a validated network device to the validated network device. In some embodiments, the computing device may receive a set of routing criteria from multiple routing devices included in the network architecture. Based at least in part on the first set of routing criteria, the computing device generates a first model of the network. The first model may further be based on a snapshot and/or a formal specification of the network. The first model may illustrate a first set of paths in the network. Therefore, the computing device determines the first model of the network based at least in part on the first set of routing criteria. In some embodiments, the first model of the network is generated by the rule processing system 306. In other embodiments, the first model of the network is generated by a different computing device or system, and the rule processing system 306 obtains the first model of the network directly or indirectly from the other computing device or system.

At block 504, the computing device identifies a second model of the network based on a second set of routing criteria. The second set of routing criteria may correspond to a modified version of the first set of routing criteria. For example, the computing device may remove, add, or otherwise modify one or more routing criteria of the first set of routing criteria to generate a second set of routing criteria. In some embodiments, the computing device may iteratively modify each possible combination of routing criteria of the first set of routing criteria and, therefore, generate multiple sets of routing criteria. For example, where the first set of routing criteria corresponds to three routing rules, the computing device may generate a second set of routing criteria by modifying the first routing rule, a third set of routing criteria by modifying the second routing rule, a fourth set of routing criteria by modifying the third routing rule, a fifth set of routing criteria by modifying the first routing rule and the second routing rule, a sixth set of routing criteria by modifying the first routing rule and the third routing rule, a seventh set of routing criteria by modifying the second routing rule and the third routing rule, and an eighth set of routing criteria by modifying the first routing rule, the second routing rule, and the third routing rule. The second set of routing criteria may correspond to multiple routing devices of the network architecture. Based at least in part on the second set of routing criteria, the computing device generates a second model of the network. In some embodiments, the computing device may generate multiple models corresponding to multiple modified versions of the first set of routing criteria. The second model may further be based on a snapshot and/or a formal specification of the network. The second model may illustrate a second set of paths in the network. Therefore, the computing device determines the second model of the network based at least in part on the second set of routing criteria. In some embodiments, the second model (and/or any additional models) of the network is generated by the rule processing system 306. In other embodiments, the second model (and/or any additional models) of the network is generated by a different computing device or system, and the rule processing system 306 obtains the model(s) of the network directly or indirectly from the other computing device or system.

At block 506, the computing device identifies one or more routing criteria (e.g., one or more excess configuration settings) from the first set of routing criteria that may be a candidate to be modified. The identification of the one or more routing criteria may be based at least in part on a comparison of the first model and the second model. Further, comparing the first model and the second model may include comparing a first set of paths corresponding to the first model and a second set of paths corresponding to the second model. The first set of paths and the second set of paths may be compared to determine if the sets of paths share a desired level of similarity. For example, the desired level of similarity may correspond to the manner in which traffic is routed. Further, the desired level of similarity may be that traffic is routed in a substantially similar manner for each set of paths, that traffic is not routed in a similar manner for each set of paths, that traffic is routed in the same manner for each set of paths, that a certain portion of traffic is routed in the same manner for each set of paths, etc. Identifying the one or more excess routing criteria may include identifying routing criteria included in the first set of routing criteria (e.g., the approved routing criteria) and excluded from the second set of routing criteria (e.g., the modified routing criteria). The one or more excess routing criteria may include one or more of redundant routing rules, permissive routing rules, unused routing rules, or lenient routing rules. Redundant routing rules may correspond to multiple routing rules of the first set of routing criteria that correspond to the same portion of the network traffic. Permissive routing rules may correspond to a subset of the network traffic and at least a portion of the subset of the network traffic may not correspond to the second set of routing criteria. Permissive routing rules may further include unused routing rules and lenient routing rules. Unused routing rules may correspond to a portion of the network traffic not included in the second set of routing criteria. Lenient routing rules may correspond to a first portion of network traffic included in the second set of routing criteria and a second portion of network traffic excluded from the second set of routing criteria. Therefore, the computing device identifies the one or more routing criteria.

At block 508, the computing device generates a modified set of routing criteria (e.g., network configuration settings, routing rules, etc.) based at least in part on identifying the one or more excess routing criteria. The modified set of routing criteria may exclude the one or more excess routing criteria. Further, the modified set of routing criteria may identify approved, possible routing criteria for the first routing device. Therefore, the computing device generates the modified set of routing criteria.

At block 510, the computing device transmits the modified set of routing criteria to the first routing device. The first routing device may store the modified set of routing criteria. Further, based on receiving the modified set of routing criteria, the first routing device may implement the modified set of routing criteria such that subsequent network traffic received by the first routing device is routed according to the modified set of routing criteria. The first routing device may route traffic according to the modified set of routing criteria in the same manner as the first set of routing criteria. For example, prior to receiving the modified set of routing rules, the routing device may be configured to drop a portion of network traffic based on the first set of routing rules and, based on receiving the modified set of routing rules, the routing device may drop the portion of the network traffic according to the modified set of routing criteria. Further, prior to receiving the modified set of routing rules, the routing device may be configured to allow a second portion of network traffic to proceed to a destination based on the first set of routing rules and, based on receiving the modified set of routing rules, the routing device may allow the second portion of network traffic to proceed to the destination according to the modified set of routing criteria. In some embodiments, the modified set of routing criteria may correspond to multiple routing devices and each routing device may receive at least a portion of the modified set of routing criteria. For example, the modified set of routing criteria as determined by the computing device may correspond to multiple routing devices. Further, each routing device may receive a subset of the modified set of routing criteria, each subset corresponding to routing rules specific to a particular routing device. In some embodiments, the computing device may generate a recommendation based on the modified set of routing criteria and may transmit the recommendation to a user of the routing device. Further, the computing device may not transmit the modified set of routing criteria to the first routing device until receiving a response from the user of the routing device to the recommendation. Therefore, the computing device transmits the modified set of routing criteria to the first routing device.

Figure 6:
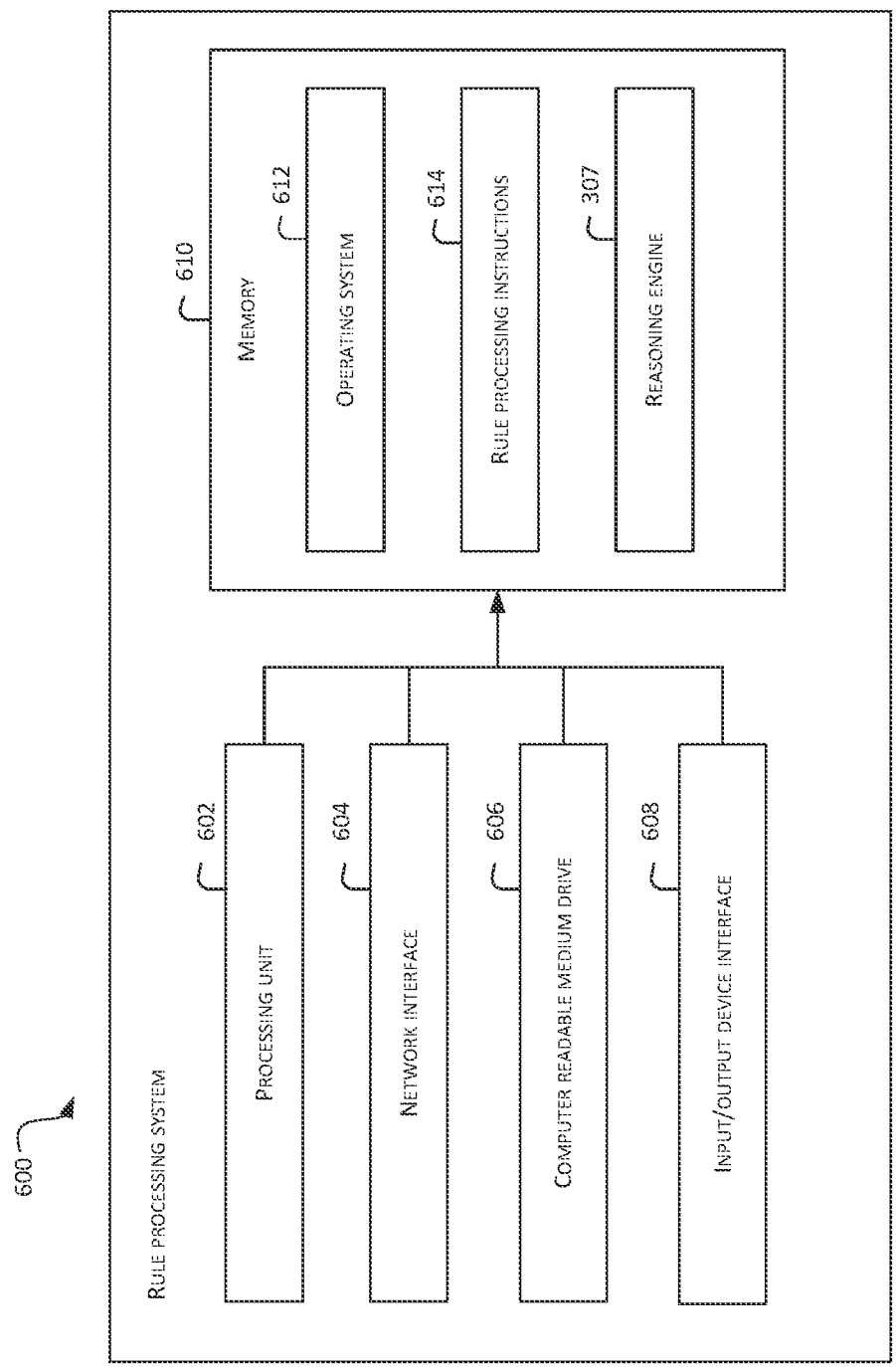
FIG. 6 shows an example computing device that may be used to implement aspects of the present disclosure.

FIG. 6 illustrates an example rule processing system 600 configured to execute the processes and implement the features described above. In some embodiments, the rule processing system 600 may include: one or more computer processors 602, such as physical central processing units ("CPUs"); one or more network interfaces 604, such as a network interface card ("NIC"); one or more computer readable medium drives 606, such as a high density disk ("HDD"), a solid state drive ("SDD"), flash drives, and/or other persistent non-transitory computer-readable media; an input/output device interface 608, such as an input output ("IO") interface in communication with one or more microphones; and one or more computer readable memories 610, such as RAM and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the rule processing system 600. The computer readable memory 610 can further include computer program instructions and other information for implementing aspects of the present disclosure. For example, in one embodiment, the computer readable memory 610 may include rule processing instructions 614. As another example, the computer-readable memory 610 may include the reasoning engine 307. In some embodiments, multiple rule processing systems 600 may communicate with each other via their respective network interfaces 604, and can implement multiple sessions each session with a corresponding connection parameter (e.g., each rule processing system 600 may execute one or more separate instances of the processes 500), in parallel (e.g., each rule processing system 600 may execute a portion of a single instance of a process 500), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a network computing provider comprising a plurality of physical network computing devices, the network computing provider configured to host a plurality of virtual network computing providers, each of the plurality of virtual network computing providers logically separated from each other virtual network computing provider of the plurality of virtual network computing providers;
one or more routing devices corresponding to a virtual network computing provider of the plurality of virtual network computing providers, wherein each routing device determines, based at least in part on a corresponding set of routing rules stored on the routing device, whether to route data to individual destinations of a plurality of destinations associated with the virtual network computing provider; and
a rule processing system comprising a computer processor and computer-readable memory, the rule processing system configured to:
obtain a first set of routing rules associated with a first routing device of the one or more routing devices, the first routing device configured to route at least a first portion of network traffic associated with the virtual network computing provider based at least in part on the first set of routing rules, the first set of routing rules identifying one or more of a prohibited destination or a permitted destination of the plurality of destinations;

determine a first set of communication paths of the virtual network computing provider based at least in part on the first set of routing rules, wherein the first set of communication paths is determined without causing data to be transmitted to the plurality of destinations;

generate a modified set of routing rules comprising a subset of the first set of routing rules, wherein the modified set of routing rules excludes at least one routing rule of the first set of routing rules;

determine a second set of communication paths of the virtual network computing provider based at least in part on the modified set of routing rules;

determine that the second set of communication paths is equivalent to the first set of communication paths; and transmit the modified set of routing rules to the first routing device, wherein the first routing device is configured to route the first portion of network traffic associated with the virtual network computing provider based at least in part on the modified set of routing rules.

2. The system of claim 1, wherein the rule processing system is further configured to:

obtain a second set of routing rules associated with a second routing device of the one or more routing devices, the second routing device configured to route at least a second portion of network traffic associated with the virtual network computing provider based at least in part on the second set of routing rules, the second set of routing rules identifying one or more of a prohibited destination or a permitted destination of the plurality of destinations;

generate a first model of the virtual network computing provider using the first set of routing rules and the second set of routing rules, wherein to determine the first set of communication paths based at least in part on the first set of routing rules, the rule processing system is configured to determine the first set of communication paths based on the first model of the virtual network computing provider; and generate a second model of the virtual network computing provider using the modified set of routing rules and the second set of routing rules, wherein to determine the second set of communication paths based at least in part on the modified set of routing rules, the rule processing system is configured to determine the second set of communication paths based on the second model of the virtual network computing provider.

3. The system of claim 1, wherein the at least one routing rule excluded from the modified set of routing rules comprises one or more of:

a redundant routing rule, the redundant routing rule corresponding to at least a second routing rule from the first set of routing rules, wherein the redundant routing rule and the second routing rule relate to a first portion of the network traffic;

an unused routing rule, the unused routing rule corresponding to a second portion of the network traffic, wherein the second portion of the network traffic is excluded from the network traffic based at least in part on a third routing rule from the first set of routing rules; or a lenient routing rule, the lenient routing rule admitting a third portion of the network traffic, wherein a subset of the third portion of the network traffic is excluded from the network traffic based at least in part on a fourth routing rule from the first set of routing rules.

4. The system of claim 1, wherein, based at least in part on the first set of routing rules, the first routing device is configured to route a subset of the network traffic to a destination of the plurality of destinations, and wherein, based at least in part on the modified set of routing rules, the first routing device routes the subset of the network traffic to the destination.

5. A system, the system comprising:

a data store including computer-executable instructions, and one or more computing devices configured to execute the computer-executable instructions to implement a rule processing service, wherein execution of the computer-executable instructions causes the one or more computing devices to:

generate a first model of a network based at least in part on a first set of routing criteria associated with a first routing device of the network, wherein the first routing device is configured to route network traffic of the network based at least in part on the first set of routing criteria;

generate a second model of the network based at least in part on a second set of routing criteria, wherein the second set of routing criteria is different than the first set of routing criteria;

identify one or more routing criteria from the first set of routing criteria based at least in part on the first model and the second model, wherein the one or more routing criteria are to be excluded from a modified set of routing criteria;

generate the modified set of routing criteria based at least in part on the first set of routing criteria, wherein the one or more routing criteria are excluded from the modified set of routing criteria; and transmit the modified set of routing criteria to the first routing device, wherein subsequent network traffic received by the first routing device is to be routed based at least in part on the modified set of routing criteria.

6. The system of claim 5, wherein the first model identifies a first set of paths between the first routing device and a particular network device and the second model identifies a second set of paths between the first routing device and the particular network device.

7. The system of claim 5, wherein to identify the one or more routing criteria, execution of the computer-executable instructions further causes the one or more computing devices to identify routing criteria included in the first set of routing criteria and modified in the second set of routing criteria.

8. The system of claim 5, wherein to generate the modified set of routing criteria, execution of the computer-executable instructions further causes the one or more computing devices to modify the one or more routing criteria from the first set of routing criteria.

9. The system of claim 5, wherein execution of the computer-executable instructions further causes the one or more computing devices to:

determine a third set of routing criteria based at least in part on one or more communications between the one or more computing devices and a second routing device, wherein the second routing device is configured to receive network traffic from the first routing device and route network traffic of the network based at least in part on the third set of routing criteria, wherein each routing criteria of the third set of routing criteria corresponds to one or more of a validation or a rejection of a particular network device of a plurality of network devices of the network, wherein identifying the one or more routing criteria is further based at least on part on the third set of routing criteria; and
transmit a second modified set of routing criteria to the second routing device, the second modified set of routing criteria indicating that subsequent network traffic received by the second routing device is to be routed based at least in part on the second modified set of routing criteria.

10. The system of claim 5, wherein the one or more routing criteria comprise one or more of:
redundant routing criteria corresponding to at least a first routing criteria and a second routing criteria from the first set of routing criteria, wherein a portion of the network traffic corresponds to both the first routing criteria and the second routing criteria; or
permissive routing criteria corresponding to a subset of the network traffic, wherein at least a portion of the subset of the network traffic is excluded by a subset of the first set of routing criteria.

11. The system of claim 10, wherein the permissive routing criteria comprises at least one of:
unused routing criteria corresponding to the subset of the network traffic, wherein the subset of the network traffic is excluded by the subset of the first set of routing criteria; or
lenient routing criteria corresponding to the subset of the network traffic, wherein a first portion of the subset of the network traffic is permitted by a second subset of the first set of routing criteria, wherein a second portion of the subset of the network traffic is excluded by the subset of the first set of routing criteria.

12. The system of claim 5, wherein, based at least in part on the first set of routing criteria, the first routing device is configured to route a subset of the network traffic to a corresponding destination, and wherein, based at least in part on the modified set of routing criteria, the first routing device routes the subset of the network traffic to the corresponding destination.

13. The system of claim 5, wherein the first routing device comprises at least one of:
a local firewall;
a network firewall;
a network device;
a network address translation device; or
a router.

14. The system of claim 5, wherein execution of the computer-executable instructions further causes the one or more computing devices to:
generate, based on the first model, a first list of possible paths the network traffic of the network is permitted to take between a plurality of network devices of the network; and
generate, based on the second model, a second list of possible paths the network traffic of the network is permitted to take between the plurality of network devices of the network;
wherein the one or more routing criteria from the first set of routing criteria are identified based at least in part on an analysis of the first list of possible paths with respect to the second list of possible paths.

15. The system of claim 5, wherein the first set of routing criteria is one or more of:
a set of routing rules;
a routing table;
a set of security access rules; or
a set of firewall rules.

16. The system of claim 5, wherein each routing criteria of the first set of routing criteria corresponds to one or more of a validation or a rejection of a particular network device of a plurality of network devices of the network, wherein the first routing device is configured to:
drop a first packet of the network traffic based at least in part on a network destination of the first packet corresponding to a rejected network device; or
transmit a second packet of the network traffic to a network destination of the second packet based at least in part on the network destination of the second packet corresponding to a validated network device.

17. The system of claim 5, wherein to generate the second model, execution of the computer-executable instructions further causes the one or more computing devices to perform a static determination without causing data to be transmitted from a network source of the network traffic to a network destination of the network traffic.

18. A computer-implemented method comprising:
under control of a computing system comprising one or more computing devices configured to execute specific instructions,
generating a first model of a network based at least in part on a first set of routing criteria associated with a routing device of the network, wherein the routing device is configured to route network traffic to a plurality of endpoints based at least in part on the first set of routing criteria;
generating a second model of the network based on a second set of routing criteria, wherein the second set of routing criteria is different than the first set of routing criteria;
identifying one or more routing criteria from the first set of routing criteria, based at least in part on an analysis of the first model and the second model;
generating a modified set of routing criteria based at least in part on identifying the one or more routing criteria; and
transmitting the modified set of routing criteria to the routing device, wherein subsequent network traffic received by the routing device is to be routed based at least in part on the modified set of routing criteria.

19. The computer-implemented method of claim 18, further comprising:
identifying a first endpoint of the plurality of endpoints as a rejected endpoint based at least in part on the modified set of routing criteria; and
identifying a second endpoint of the plurality of endpoints as a permitted endpoint based at least in part on the modified set of routing criteria;
wherein the modified set of routing criteria causes the routing device to:
drop a first packet of the network traffic based at least in part on determining a network destination of the first packet corresponds to the first endpoint, and
transmit a second packet of the network traffic to a network destination of the second packet, based at least in part on determining the network destination of the second packet corresponds to the second endpoint.

20. The computer-implemented method of claim 18, further comprising:

generating, based on the first model, a first list of possible paths the network traffic of the network is permitted to take between the plurality of endpoints; and generating, based on the second model, a second list of possible paths the network traffic is permitted to take between the plurality of endpoints;

wherein identifying the one or more routing criteria from the first set of routing criteria is based at least in part on an analysis of the first list of possible paths with respect to the second list of possible paths.

* * * * *